United States Patent [19]

Knietzsch et al.

[11] Patent Number: 4,848,264
[45] Date of Patent: Jul. 18, 1989

[54] POINTER FOR AN INDICATING INSTRUMENT

[75] Inventors: Hans-Dieter Knietzsch, Bad Homburg; Gerhard Wesner, Oberursel, both of Fed. Rep. of Germany

[73] Assignee: VDO Adolf Schindling AG, Frankfurt am Main, Fed. Rep. of Germany

[21] Appl. No.: 82,887

[22] Filed: Aug. 5, 1987

[30] Foreign Application Priority Data

Aug. 22, 1986 [DE] Fed. Rep. of Germany ....... 3628540

[51] Int. Cl.[4] ............................................. G01D 13/22
[52] U.S. Cl. ..................................... 116/332; 116/328
[58] Field of Search ................................. 116/327–332, 116/288, DIG. 6, DIG. 36, 286, 287; 362/26, 32; 368/223, 228, 238

[56] References Cited

U.S. PATENT DOCUMENTS

| 2,768,606 | 10/1956 | Polye et al. | 116/288 |
| 3,559,616 | 2/1971 | Protzmann | 116/332 |
| 4,300,470 | 11/1981 | Furukawa | 116/332 |
| 4,625,262 | 11/1986 | Sakakibara et al. | 362/26 |

Primary Examiner—William A. Cuchlinski, Jr.
Assistant Examiner—W. Morris Worth
Attorney, Agent, or Firm—Martin A. Farber

[57] ABSTRACT

A pointer for an indicating instrument is constructed of material transparent to light, the pointer having an elongated shape and a cross section having two inclined sides directed towards an apex, and a lower side opposite the apex and facing a face of the indicating instrument. The lower surface is provided with a layer of coloring, substantially opaque to the light, and giving a colored appearance to the pointer upon viewing the pointer by looking straight down upon the indicator face or at an angle thereto. The inclination of the pointer sides provides for respective refraction and total internal reflection to viewing rays of light which make visible the coloring.

8 Claims, 2 Drawing Sheets

4,848,264

POINTER FOR AN INDICATING INSTRUMENT

FIELD AND BACKGROUND OF THE INVENTION

The present invention refers to an indicating-instrument pointer which has a coloring and can be illuminated by light which floods within it.

Such pointers are widely known and used.

Pointers for indicating instruments are frequently to be made in color for reasons of better visibility or else of design. Pointers which are illuminatable by flooding light cannot simply be provided with a color coating since then, a greater or lesser amount of light would be absorbed, depending on the permeability to light of the coating. Such a loss of light naturally also occurs when the pointer is colored throughout. This can lead to the pointer no longer being sufficiently bright specifically at its tip where it should illuminate particularly well. Aside from this, light losses mean a brighter source of light, which is undesired in view of the greater consumption of energy and frequently also the larger amount of space required.

It is also known to couple colored light into a pointer of uncolored material. In such cases the light losses occur upon the production of the colored light.

It is an object of the invention to develop a pointer of the aforementioned type in such a way that it is colored without undesired light losses occurring as a result thereof.

SUMMARY OF THE INVENTION

According to the invention, the coloring is created by a layer of color (2) on the lower side of the pointer, and the pointer (1) is of such cross-section that the layer of color (2) is visible upon viewing from different directions on the other sides of the pointer (1) as a result of refraction and total rejection.

By this development, the light can flood within the pointer undisturbed by coloring and emerge freely on all desired sides. Since the coating need be applied only on the lower side, it is in no way disturbing. It is even useful, since it prevents light from passing from the pointer onto the dial and light reflections, which reduce the legibility of the indicating instrument from being produced.

From a manufacturing standpoint it is very desirable that the pointer (1) have the shape in cross section of an isosceles triangle with its shortest side facing downward. With such a cross section, the color coating appears on the two legs of the triangle upon all directions of viewing which enter into consideration for an indicating instrument. The application of the coating to the lower side of the pointer is very simple, since that side is flat.

The invention, however, is not limited to the cross-sectional shape mentioned above. The following cross-sectional shapes are also advantageous for different fields of use. In this respect, the pointer (1) can have a cross section substantially in the shape of an isosceles triangle whose two legs have a concave or convex curvature.

Another feature is that the lower side of the pointer (1) is pulled inward towards the inside of the pointer. Still a further feature is that the pointer (1) is of trapezoidal cross-section. A pulled-in lower side of the pointer results in a very particularly large viewing angle being possible within which the sides of the pointer still appear colored.

The invention permits of numerous embodiments.

BRIEF DESCRIPTION OF THE DRAWING

With the above and other objects and advantages in view, the present invention will become more clearly understood in connection with the detailed description of preferred embodiments, when considered with the accompanying drawings, of which.

DETAILED DESCRIPTION OF THE PREFERRED EMBODIMENT

Figure 1:
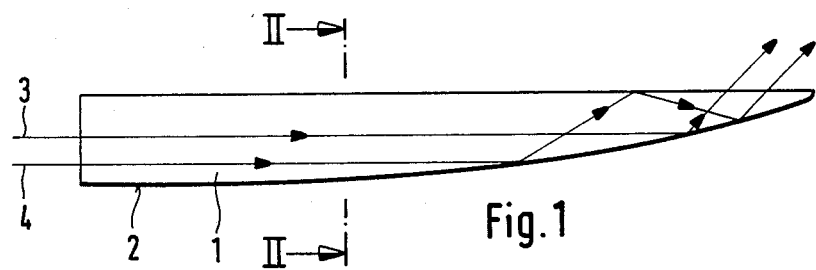
FIG. 1 is a side view of a pointer according to the invention.

FIG. 1 shows a pointer 1 which is provided on its lower surface with a colored light-impervious layer of color 2. Light floods within it and can, aside from the coated lower side, emerge from all sides so that the pointer 1 can be illuminated by flooding light, as indicated by the two light rays 3, 4.

Figure 2:
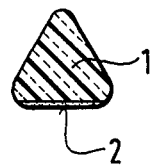
FIG. 2 is a cross section through the pointer along the line II—II of FIG. 1.

FIG. 2 shows that the pointer 1 has the shape of an isosceles triangle resting on its shorter side, the layer of color 2 being located on the shorter side and thus on the bottom of the triangle.

Figure 3:
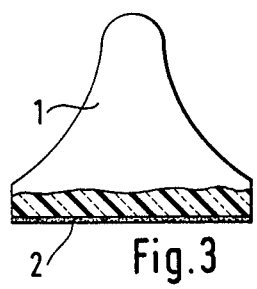
FIGS. 3 to 6 show different cross-sectional shapes of a pointer according to the invention.
Figure 4:
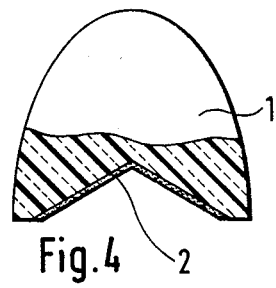
Figure 5:
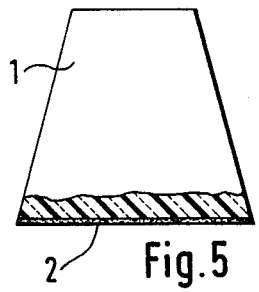
Figure 6:
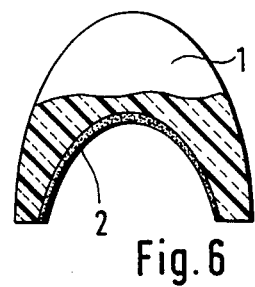

In the embodiment of FIG. 3, the legs of the triangle are concave. A convex shape is, however, also possible, as shown in FIG. 4. It can also be noted in FIG. 4 that the bottom of the pointer 1, which is provided with the layer of color 2, has been pulled inward in this figure. In accordance with FIG. 5, the cross section of the pointer may also be trapezoidal. The embodiment of FIG. 6 differs from that of FIG. 4 in the manner that the bottom is formed not by two flat surfaces directed inward into the pointer but by a single surface which is curved into the pointer 1.

Figure 7:
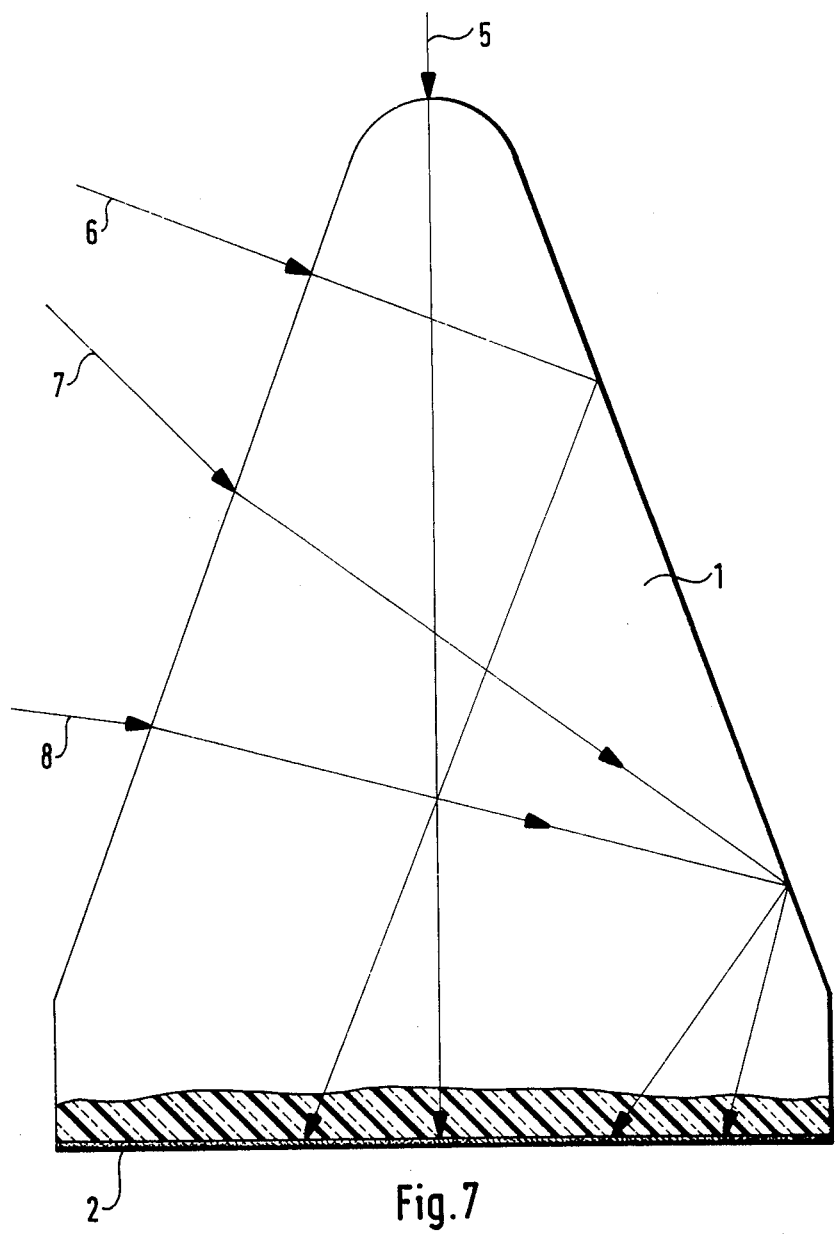
FIG. 7 shows different ray paths in a pointer according to the invention.

FIG. 7 shows that for a pointer 1 the coating 2 can be seen from very different directions of viewing. If one views the pointer from above, as represented by a ray path 5, then one looks directly on the layer of color 2. A ray path 6, which is directed approximately perpendicular to one side of the pointer 1, is totally reflected on the opposite side so that it also leads to the layer of color 2. This is true also of the directions of viewing which are steeper or shallower than the ray path 6, they being represented by the ray paths 7 and 8. It can be noted in each case that upon entrance into the optically denser medium of the pointer 1, the light is first of all refracted and then completely reflected upon impinging the opposite side. If one looks horizontally or even obliquely from below at one side of the pointer 1, total reflection no longer takes place on the rear side of pointer 1 as a result of the small angle of incidence, so that one looks through the pointer 1 and therefore the pointer 1 does not appear colored.

We claim:

1. An indicating-instrument pointer which has a coloring which is illuminatable by uncolored light which floods within it so as to enable the pointer to be seen colored, comprising:

a layer of non-white color disposed on a lower side of the pointer for providing the coloring; and wherein said pointer has other sides above said lower side, said other sides are transparent, and said other sides are arranged so as to enable a wide angular continuum of incident light rays thereon to simply refract without diffusion entering the pointer and internally totally reflect at the opposite of said other sides and to impinge on the layer of color; and wherein the pointer is constructed with a cross-section making visible the layer of color upon viewing, from different directions within said wide angular continuum, the other sides of the pointer, by refraction without diffusion through said other sides and total internal reflection on the opposite of said other sides, respectively.

2. An indicating-instrument pointer according to claim 1, wherein
said pointer, in cross section, is shaped as an isosceles triangle with its shortest side being said lower side and facing downwardly.

3. An indicating-instrument pointer according to claim 1, wherein
the cross-section of the pointer is substantially in the shape of an isosceles triangle, two legs of the triangle forming said other sides have a concave curvature.

4. An indicating-instrument pointer according to claim 1, wherein
the cross-section of the pointer is substantially in the shape of an isosceles triangle, two legs of the triangle forming said other sides have a convex curvature.

5. An indicating-instrument pointer according to claim 1, wherein
portions of the lower side of the pointer are directed inward towards the inside of the pointer.

6. An indicating-instrument pointer according to claim 1, wherein
the pointer is of trapezoidal cross-section.

7. An indicating-instrument pointer according to claim 1, wherein
the lower side is concave.

8. An indicating-instrument pointer which has a coloring which is made visible in ambient light, comprising:
a layer of color disposed on a lower side of the pointer for providing coloring; and wherein
the pointer is constructed with a cross-section making visible the layer of color upon viewing from different directions on the sides of the pointer, other than the lower side, by refraction and total reflection; and
said pointer, in cross section, is shaped substantially in the form of an isosceles triangle with its shortest side being said lower side and facing downwardly, at least one of said sides being curved.

* * * * *